United States Patent [19]
Ben-Nun et al.

[11] Patent Number: 5,633,867
[45] Date of Patent: *May 27, 1997

[54] LOCAL MEMORY BUFFERS MANAGEMENT FOR AN ATM ADAPTER IMPLEMENTING CREDIT BASED FLOW CONTROL

[75] Inventors: Michael Ben-Nun, Jerusalem; Simoni Ben-Michael, Givat Zeev; Simcha Perl, Jerusalem, all of Israel; Kadangode K. Ramakrishnan, Maynard, Mass.

[73] Assignee: Digital Equipment Corporation, Maynard, Mass.

[*] Notice: The term of this patent shall not extend beyond the expiration date of Pat. No. 5,482,526.

[21] Appl. No.: 269,984

[22] Filed: Jul. 1, 1994

[51] Int. Cl.⁶ .............................. H04L 12/56; G06F 13/00
[52] U.S. Cl. ..................... 370/399; 370/412; 395/250
[58] Field of Search ................... 395/250, 882, 395/872, 849, 200.01, 200.02, 200.13, 311; 370/60, 60.1, 61, 94.1, 94.2

[56] References Cited

U.S. PATENT DOCUMENTS 5,483,526  1/1996  Ben-Nun et al ................. 370/60.1
5,519,698  5/1996  Lyles et al. ..................... 370/60

OTHER PUBLICATIONS

IEEE Spectrum, Feb. 1994, pp. 42–45, by James Lane, TRAC Associates Inc., 'ATM knits voice, data on any net'.

ATM in Private Networking, by Anthony Alles, Product Line Manager, Hughes Lan Systems, Interop '92 Version.

*Primary Examiner*—Jack B. Harvey
*Assistant Examiner*—Ario Etienne
*Attorney, Agent, or Firm*—Kenneth F. Kozik

[57] ABSTRACT

An Asynchronous Transfer Mode (ATM) network device having a receiver portion capable of receiving ATM cells on one of a number of virtual circuits (VCs) from an upstream ATM switch, a local memory used to store the ATM cells, a management system to manage the local memory using a number of queues, a system for assembling ATM cells into packets, a system for transmitting the packets to a host memory, and a transmitter portion having a system for indicating the transmitting of packets to the host memory to the upstream ATM switch.

26 Claims, 7 Drawing Sheets

LOCAL MEMORY BUFFERS MANAGEMENT FOR AN ATM ADAPTER IMPLEMENTING CREDIT BASED FLOW CONTROL

FIELD OF THE INVENTION

This invention relates generally to the field of computer networks, and more particularly to a local memory buffer management scheme for an asynchronous transfer mode (ATM) adapter implementing flow control.

BACKGROUND OF THE INVENTION

In general terms, a computer network is a collection of end systems (also known as nodes) interconnected through one or more communication links. Generally, the end systems both send data to other end systems on the network and receive data sent by other end systems on the network. When an end system is a sender of data, it is referred to as a source for that data; when it is a receiver of data, it is referred to as a destination for the data. Typically, end systems act as both sources and destinations depending on whether they are sending or receiving data. When acting as a source, the system typically sends data in the form of messages over a communication link. Messages can flow back and forth to other communication links and end systems within the network through bridges or routers, which are used to interconnect multiple communication links.

Each message comprises a sequence of bits. Typically, messages sent over a network are divided up into smaller blocks of information called packets. The flow of packets in the network is usually referred to as traffic. An important design objective in networks is controlling traffic so that individual packets will not be transmitted at a faster rate than they can be processed by the communication links, or intermediate systems such as bridges or routers, through which the packets will pass, or by the destinations.

Asynchronous transfer mode (ATM) is one of the general class of digital switching technologies that relay and route traffic by means of a virtual circuit identifier (VCI) contained within the cell. Unlike common packet technologies, such as X.25 or frame relay, ATM uses very short, fixed length units of information, called cells. In applications utilizing ATM, packets at a source are first broken up into these fixed length packets (ATM cells), transmitted, and then reassembled at a destination. ATM cells are 53 bytes long. They consist of a 5-byte header (containing an identifier of data flow which implicitly identifies the source address and the destination address) and a 48-byte information field. The header of an ATM cell contains all the information the network needs to relay the cell from one node to the next over a pre-established route. User data is contained in the remaining 48 bytes.

ATM uses a concept of virtual networking (or channels) to pass traffic between two locations, establishing virtual connections between a pair of ATM end-systems which are needed to connect a source with a destination. These connections are termed "virtual" to distinguish them from dedicated circuits. ATM cells always traverse the same path from source to destination. However, ATM does not have to reserve the path for one user exclusively. Any time a given user is not occupying a link, another user is free to use it.

ATM connections exist only as sets of routing tables held in each network node, switch, or other intermediate system, based on the virtual circuit identifier (VCI) and virtual path identifier (VPI) contained in the cell header. When a virtual path is established, each node (or switch) is provided with a set of lookup tables that identify an incoming cell by header address, route it through the node to the proper output port, and overwrite the incoming VCI/VPI with a new one that the next node along the route will recognize as an entry in its routing table.

The cell is thus passed from switch to switch over a prescribed route, but the route is "virtual" since the facility carrying the cell is dedicated to it only while the cell traverses it. Two cells that are ultimately headed for different destinations may be carried, one after the other, over the same physical wire for a common portion of their journey.

With ATM, the successful transmission of packets from a source to a destination requires successful delivery of all the ATM cells formed from the original information packet. If any one cell is lost, the entire packet must be re-transmitted again. When the ATM station repeatedly tries to resend the original information packet, the network becomes increasingly loaded as more network congestion occurs and more cells are lost. As a result, ATM networks can operate efficiently when there is no cell loss.

A common method of controlling traffic, also known as flow control, is called the credit-based, per hop, per virtual circuit (VC) flow control. This method allows the network links to operate near full capacity without cell loss or instability. ATM credit based flow control requires that a cell not be transmitted on a communication link unless the sender knows that a buffer is available at the receiver to hold the cell. The sender maintains a "credit balance" for each virtual circuit (VC). As cells are sent, the sender decrements the balance, and refrains from sending a new cell if the balance is zero. When the receiver forwards a cell (thereby freeing a buffer), it transmits to the sender a credit. The sender and receiver in hop by hop flow control are on either side of the communications link.

In ATM, the receiver adapter at the end of a vitual circuit (VC) can be in a state where it reassembles in its local memory a large amount of packets at the same time. The reassembled packets can be as large as 64K bytes. For implementations where the adapter frees up its local memory only when the packet reassembly has been finished, there is a need for a large local memory. The reason for this is that the adapter should be able to simultaneously reassemble X packets, where X may be the number of all of its virtual circuits it supports simulataneously.

If the adapter has a smaller local memory and uses credit-based flow control to stop the senders from overflowing its local memory, "deadlock" may occur. This deadlock will be caused by the fact that the adapter, when beginning to become congested, will stop returning credits to the senders, and not free up its local memory because packets have not been completely reassembled. In addition, the senders will not attempt to send the last cells for the packet because they have no more credits to transmit new cells.

One problem with this is that, if the adapter has to support a very large number of open virtual circuits, very large local memory will be required.

A common approach to this problem is to reduce the number of supported receive virtual circuits. A problem with this approach is that it limits the maximum number of connections that can be open at the same time, thus degrading overall network performance.

A method of using credit-based flow control in such a way that the adapter can support a large amount of open virtual circuits simultaneously without the requirement of a large local memory is needed.

SUMMARY OF THE INVENTION

In accordance with the present invention, an asynchronous transfer mode (ATM) network device having a receiver portion, said receiver portion capable of receiving a plurality of ATM cells on one of a plurality of virtual circuits (VCs) from an upstream ATM switch, a local memory, said local memory used to store the plurality of ATM cells, means for managing said local memory using a plurality of queues, means for assembling ATM cells into a plurality of packets, means for transmitting said plurality of packets to a host memory, and a transmitter portion, said transmitted portion having a means for indicating said transmitting of said packets to said host memory to said upstream ATM switch. With such an arrangement, the adapter can support a large amount of open VCs simultaneously without the requirement of a large local memory.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
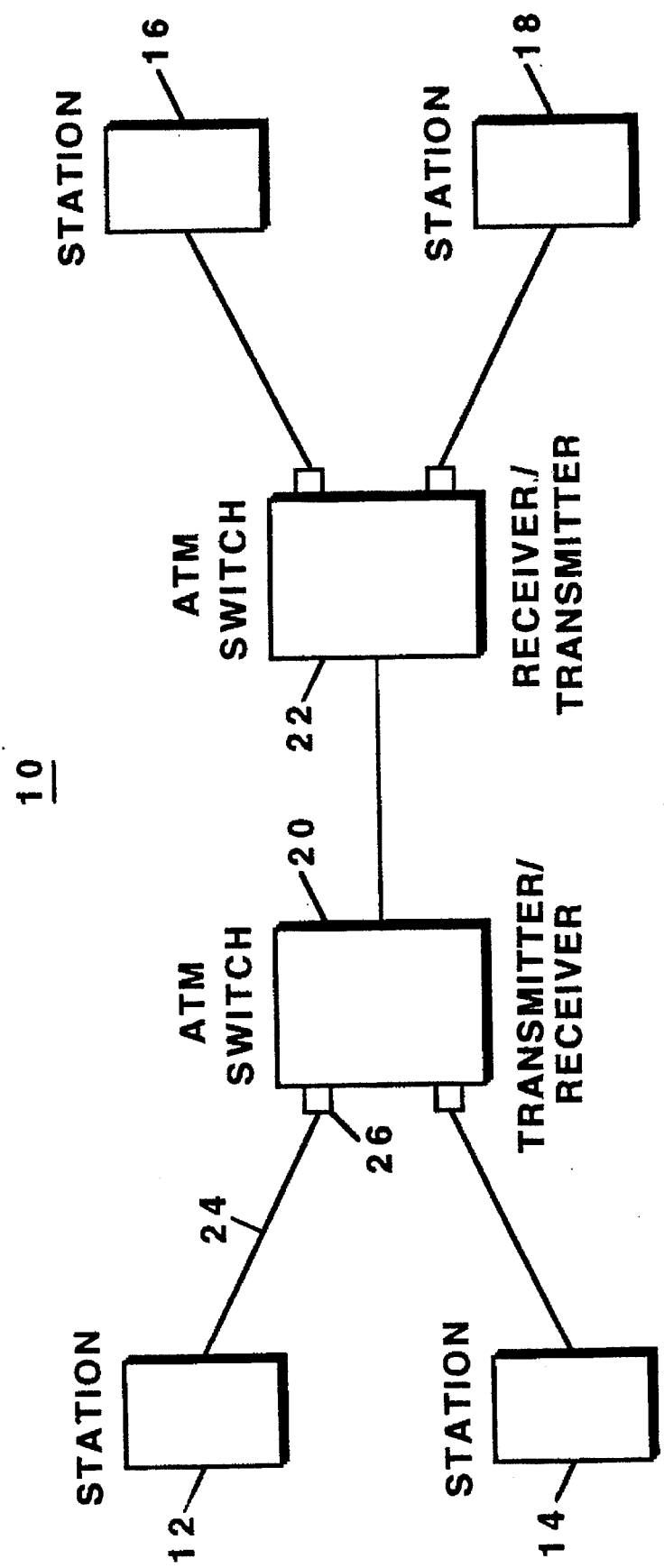
FIG. 1 is a block diagram showing an exemplary asynchronous transfer mode (ATM) local area network (LAN)

Referring to FIG. 1, an exemplary asynchronous transfer mode (ATM) local area network (LAN) 10 is shown to include four stations labeled as 12, 14, 16, and 18, respectively. The ATM LAN 10 is also shown to include two ATM switches labeled as 20 and 22, respectively. An ATM adapter resides in each of the stations 12, 14, 16, and 18. By way of example, if station 12 is transmitting packets for station 16, the ATM adapter in station 12 is involved in segmenting the packets into cells, and affixing the appropriate fields in a cell header (of FIG. 2 and FIG. 3). The ATM adapter in station 16 is involved in reassembling the cells received into a complete packet and delivering the packet to station 16. Control of the ATM LAN 10 resides in the ATM switches 20 and 22, which route messages between stations and control access in the event of congestion. For example, the station 12 may send a cell over a line 24 to ATM switch 20 through port 26. ATM switch 20 will route the cell to a destination, Station 16, for example, according to a VCI/VPI in an ATM cell header (more fully described with reference to FIG. 2 and FIG. 3).

Because each port 26 is dedicated to one station 12, other stations (14 for example) do not have to contend for access to the ATM switch 20. Thus, the station 12 has full access to the line 24 regardless of the activity of other stations with other such connections. For example, if a 5 Mb file is being transmitted from station 12 to station 16, it can move to the ATM switch 20 in a continuous burst at the full channel rate, instead of sharing the communication link in the other stations and having intervening frames from other stations as with other LANs, such as Ethernet, Token Ring, and Fiber Distributed Data Interface (FDDI) LANs.

Figure 2:
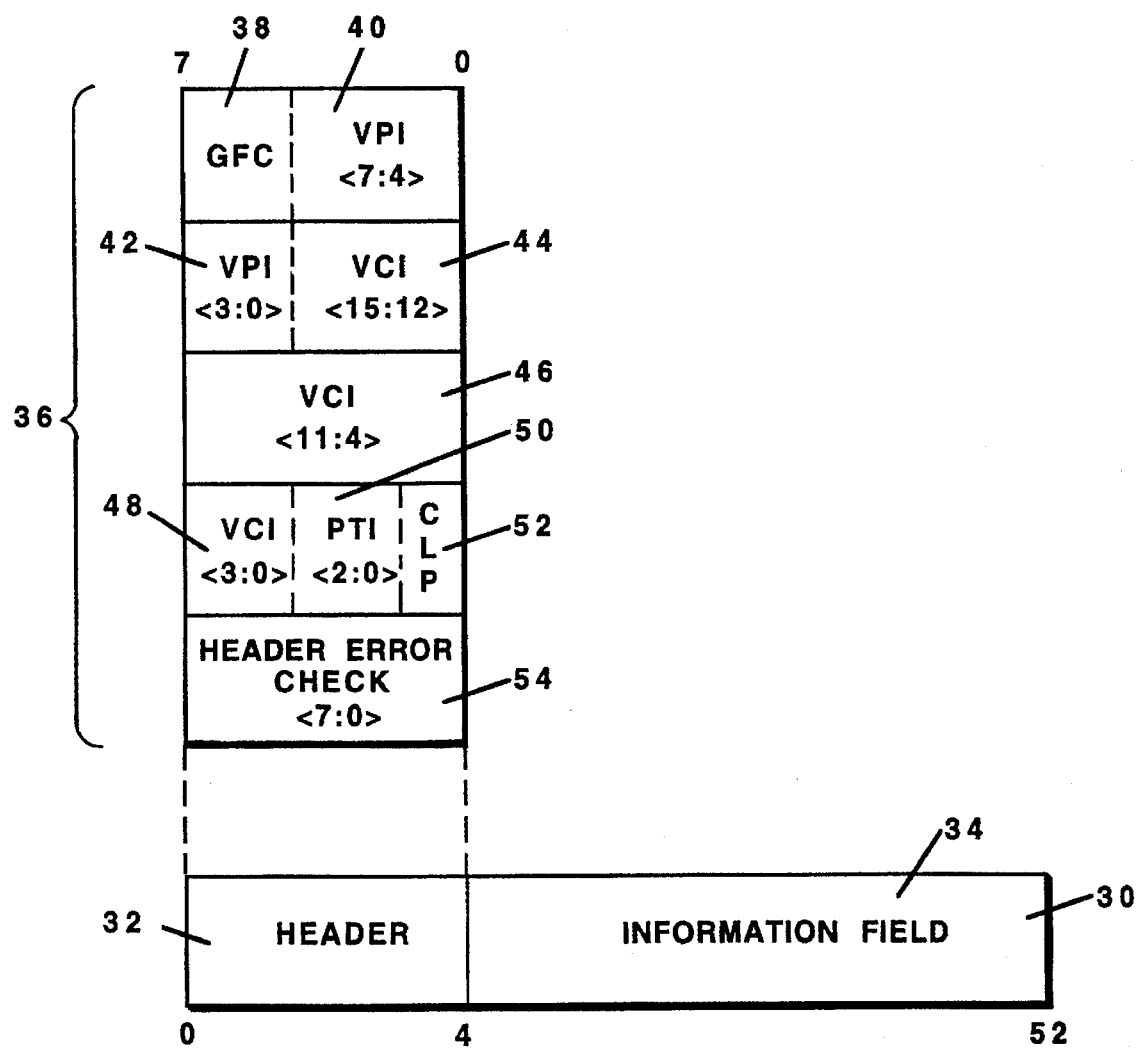
FIG. 2 is a block diagram showing an ATM cell.

Each message in the ATM LAN 10 is comprised of one or more fixed length units of data called ATM cells. Referring to FIG. 2, an ATM cell 30 is shown to be 53 bytes long. The ATM cell 30 is typically divided into a 5-byte header 32 and a 48-byte information field 34. The 5-byte header 32 contains several fields 36. Specifically, a first byte contains a generic flow control (GFC) field 38 and part of a virtual path identifier (VPI) field 40. A second byte contains another part of the VPI field 42 and part of a virtual channel identifier (VCI) field 44. A third byte contains another part of the VCI field 46. A fourth byte contains the remaining part of the VCI field 48, a payload type identifier (PTI) field 50, and a cell loss priority field (CLP) 52. A fifth byte contains a header error check 54.

The address of the ATM cell 30 is contained in the fields labeled VPI (40 and 42) and VCI (44, 46, and 48). This two-part identification allows the ATM LAN 10 (of FIG. 1) to route data contained in the information field 34 between locations while maintaining the identity of individual circuits within a trunk.

Figure 3:
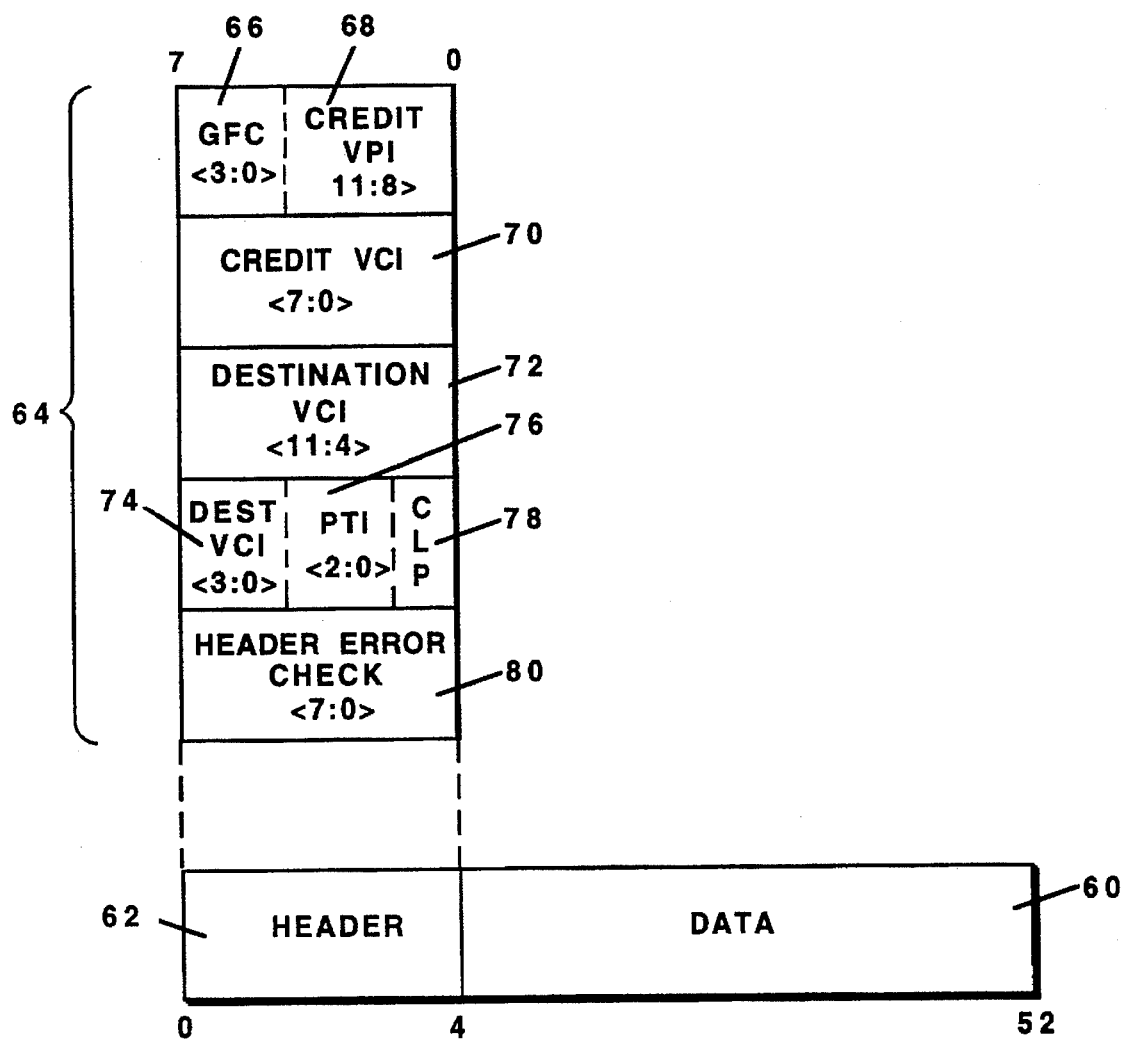
FIG. 3 is a block diagram showing aa ATM cell which includes a credit field.

Referring to FIG. 3, an alternative header 62 of an ATM cell 60 is shown. The header 62 is 5 bytes long and contains several fields 64. Specifically, a first byte contains a GFC field 66 and a part of credit virtual circuit identifier (credit VCI) 68. A second byte contains another part of the credit VCI 70. A third byte contains part of a destination VCI 72. A fourth byte contains a remaining part of the destination VCI 74, a PTI field 76, and a CLP field 78. A fifth byte contains a header error check field 80.

As mentioned above, with any LAN, network-based applications in one station create packets for transmission to other stations. The ATM LAN 10 breaks packets into fixed-size (53 bytes) cells before they are transmitted. For network equipment designers, the challenge with small cells is that loss of any single cell destroys the entire packet of which it is a part. For example, a 9180 byte packet is broken into 192 ATM cells (48 bytes of data per ATM cell). The loss of any one cell because of congestion in the network (communication link or intermediate switches) requires retransmission of all 192 ATM cells. The loss of cells, and the corollary loss of packets, is bad enough, but more significant impact is that these lost packets are now retransmitted into the congested network, causing more congestion and more cell loss. This creates an inherently unstable feedback loop of congestion, cell loss, more congestion, and more cell loss. This snowball effect can lead to a state of the network called "throughput collapse." Most of the newly transmitted packets are thus destined for congestion and discard.

One way to reduce the probability of cell loss is to use ATM's ability to reserve bandwidth. Each application can have a virtual circuit (VC) established through each ATM link and ATM adapter with guaranteed bandwidth. This can avoid cell loss but only at a very high cost. For example, when 100 stations set up VCs to a server using a 155 Mbps link, each VC will have only about 1.5 Mbps bandwidth to access the server. While this is suitable for applications generating a steady flow of information, it is generally not true of data applications to generate cells at such a rate. Data applications generate cells in a bursty fashion, and hence leave some of the above allocated bandwidth unusable. This leads to inefficient use of the link.

To avoid the above inefficiencies and to provide a high performance ATM LAN 10, a means of controlling the flow of cells (known as flow control) based on a link-by-link system of control was designed. This design is based on credits and buffers per VC.

Figure 4:
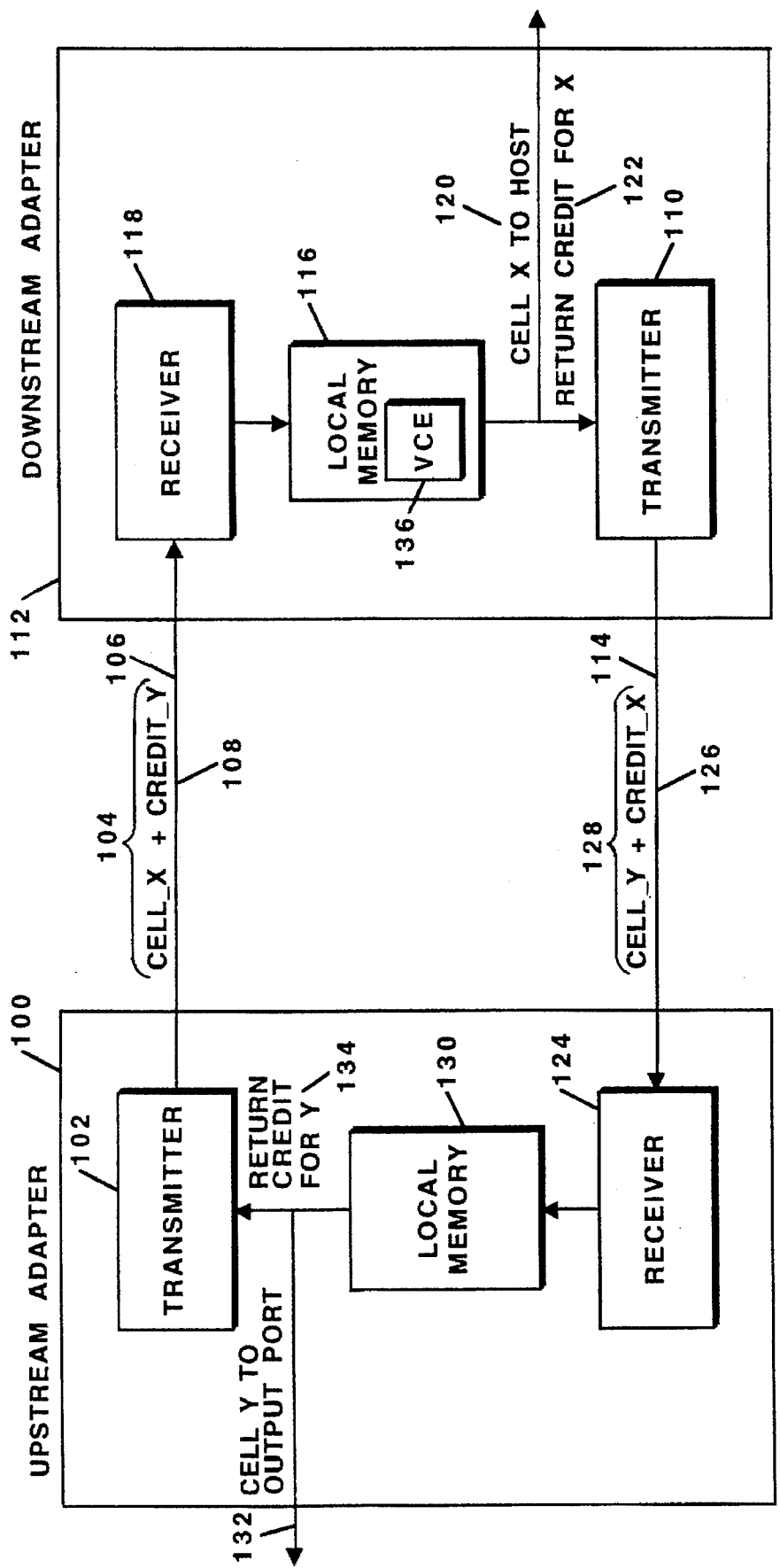
FIG. 4 is a block diagram showing memory management of a credit-based ATM flow control mechanism in accordance with one embodiment of the present invention.

Referring to FIG. 4, an exemplary credit-based ATM flow control system is illustrated. In the exemplary credit-based ATM flow control system a transmitter portion 102 of an upstream ATM switch 100 is sending an ATM cell 104 on virtual circuit identifier (VCI) 106. The credit field 108 in ATM cell 104 is carrying a credit for a transmitter portion 110 of a downstream ATM adapter 112 for VCI 114. A "credit" is simply an okay to send one or more ATM cells on a VCI, with the assurance that the cell(s) will have a buffer at the remote end and hence not experience loss.

In the exemplary credit-based ATM flow control system of FIG. 4, when the downstream ATM adapter 112 moves the ATM cell 104 of VCI 106 from its local memory 116 from a receiver portion 118 and into a host memory 120, the downstream ATM adapter 112 generates a credit 122 for the transmitter portion 102 of the upstream ATM switch 100 to allow transmission of a new ATM cell (not shown) on VCI 106. This credit for the transmitter portion 102 can be carried by any ATM cell transmitted by the transmitter portion 110 of the downstream ATM adapter 112 to a receiver portion 124 of the upstream ATM switch 100. For example, in FIG. 4 a credit 126 for VCI 106 is carried on an ATM cell 128 on VCI 114.

The receiver portion 124 of the upstream ATM switch 100 receives the ATM cell 128 from the transmitter portion 110 of the downstream ATM adapter 112 and stores it in its local memory 130. The upstream ATM switch 100 uses the credit 126 to transmit another cell on VCI 106. When the upstream ATM switch 100 moves the ATM cell 128 from its local memory 130 to one of its output ports 132, the upstream ATM switch 100 generates a credit 134 for VCI 114, which will be carried by any ATM cell transmitted towards the downstream ATM adapter 112.

In order to be able to maintain a full link speed for each virtual circuit, it is necessary to provide each transmit VC with an initial fixed number of credits. This number should be large enough to ensure that the transmitter portion 102 of an upstream ATM switch 100 will not stop transmitting before the upstream ATM switch 100 receives a first credit from the transmitter portion 110 of the downstream ATM adapter 112. Thus, the receiver portion 118 of the downstream ATM adapter 112 should have enough local memory 116 to accommodate a number of cells corresponding to the transmission of initial credits given to the upstream ATM switch 100.

In credit-based ATM flow control, which is described fully with reference to FIG. 4, the credit VCI field (68 and 70) of each arriving ATM cell 60 (of FIG. 3) identifies the transmit virtual circuit (VC) which is given a new credit for transmission from a transmitter to a receiver. After moving out this newly arrived ATM cell 60 from its memory buffer, the receiver should return a credit to the sender. The virtual circuit whose credit is returned is for the one that this ATM cell 60 was sent on, i.e., the value of the VCI field (72 and 74). Transmitting or receiving credits may be done one credit per an ATM cell 60, or in a scheme that may provide a plurality of credits per an ATM cell 60.

An arriving ATM cell 60 may be a null cell. This is indicated by a destination VCI (72 and 74) having a value of zero. In this case, the ATM cell 60 is ignored and no credit is sent back. However, a null ATM cell 60 may carry a credit, i.e., a non-zero VCI (68 and 70). A transmitted ATM cell 60 is not carrying any credits if its credit VCI (68 and 70) is equal to zero.

Figure 5:
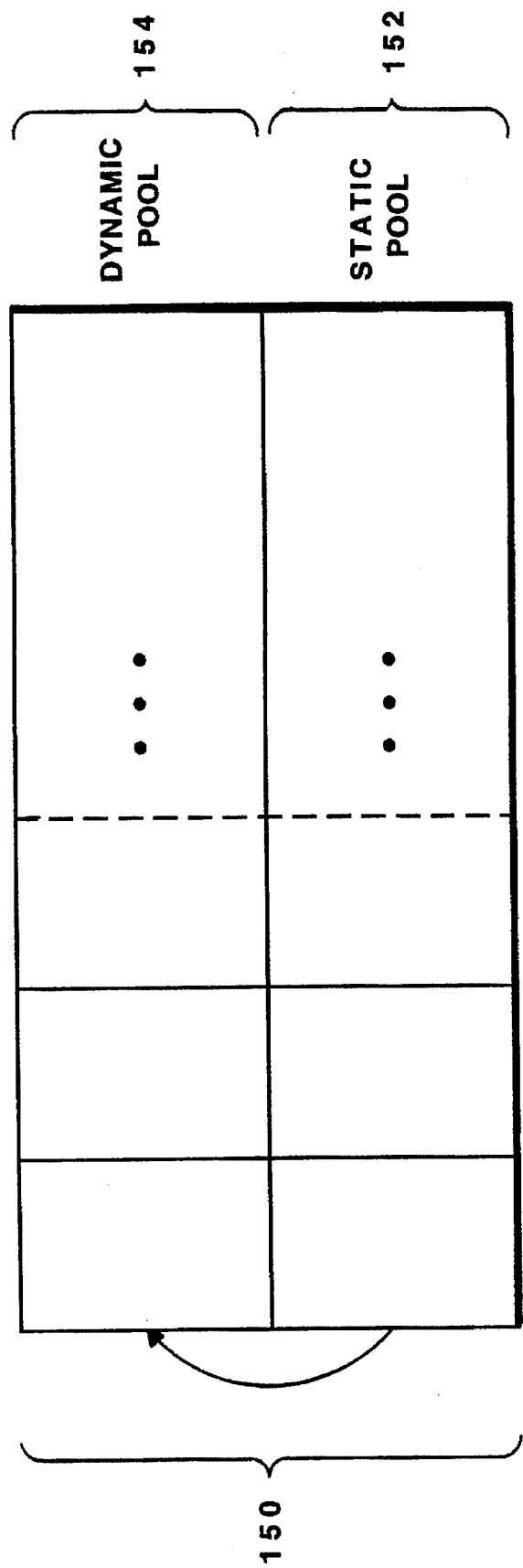

If an arriving ATM cell 60 contains a credit for one of the transmit VCs, i.e., credit VCI (68 and 70) not equal to zero, the credit balance of the transmit VC is incremented by one, and, if the VC has been stopped due to a deficiency in credits, the VC is restarted. Referring to FIG. 5, the local memory 116 (of FIG. 4) of the receiver portion 118 (of FIG. 4) of the downstream ATM adapter 112 (of FIG. 4) is divided into two buffer pools 150. One of the buffer pools 150 is referred to as a static pool 152. The static pool 152 is used to accommodate the reception of ATM cells from all VCs, as long as these VCs share a positive balance of credits. The size of the static pool 152 is given the limit on the minimum memory size the downstream ATM adapter 112 needs to have as buffering in its local memory 116. The initial size of the static pool 152 is determined by taking the sum across all VCs of the number of VCs times the number of initial credits per VC. The number of initial credits for each VC is typically set to be sufficient for the VC to flow at the full link rate, and the credit for the first cell sent in a given burst of cells has its credits returned to the sended before the sender exhausts its "initial credits," if there is no contention from any other VC on the link.

This static pool 152 includes empty ATM cell buffers that are used to store ATM cells arriving from the transmitter portion 102 of the upstream ATM switch 100 even when the transmitter portion 110 of the downstream adapter 112 stops sending credits for those received ATM cells due to congestion. The transmitter portion 102 of the upstream ATM switch 100 will stop sending cells to the downstream ATM adapter 112 only when it has used up all of its credits which were initially given.

One of the buffer pools 150 is referred to as a dynamic pool 154. The dynamic pool 154 is used to reassemble the packets.

Figure 6:
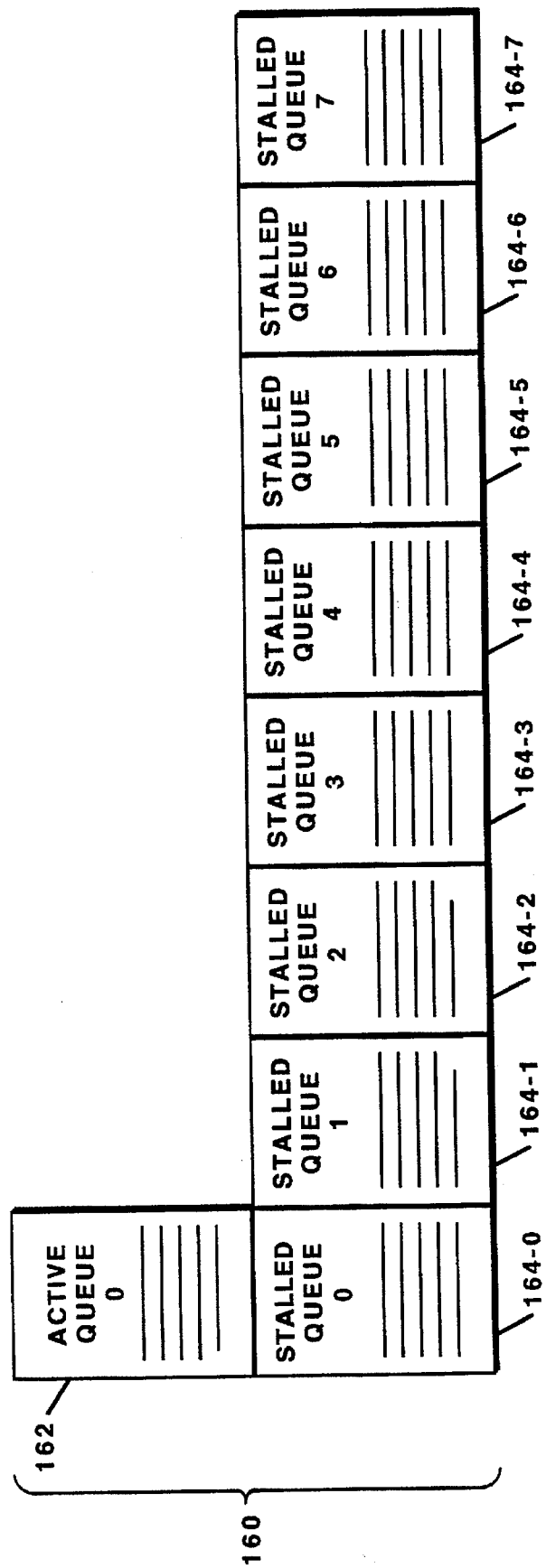

Referring to FIG. 6, receiver portion 118 of the downstream ATM adapter 112 has nine queues 160 for packet reassembly implemented in its local memory 116. The nine queues 160 consist of one active queue 162 and eight stalled queues labeled as 164-0, 164-1, 164-2, 164-3, 164-4, 164-5, 164-6, and 164-7, respectively. There are eight receive host memory queues that are independent of any association with the "stalled queues." When a packet is reassembled, it is just placed on one of the receive host queues.

When the downstream ATM adapter 112 receives in its receiver portion 118 a first ATM cell 104 for a certain VC (VC 106 for example), the downstream ATM adapter 112 has two choices. The downstream ATM adapter 112 may enqueue this VC 106 into the active queue 162, or the downstream ATM adapter 112 may enqueue this VC 106 into one of the eight stalled queues (for example, if a packet has to be placed in a stalled queue, the queue that is chosen to be placed on is based on the VC that it is received on).

The transmitter portion 110 of the downstream ATM adapter 112 will always return credits to a VC which is placed in the active queue 162. As long as the VC is queued in the stalled queue (164-0, for example), credits will be kept in the downstream ATM adapter 112 and will be returned to the upstream switch 100 only when the VC is dequeued from stalled queue 164-0 and enqueued into the active queue 162. The conditions by which a VC queued in a stalled queue 164-0 is moved to the active queue 162 will be discussed below.

As mentioned above, for each of the eight host receive queues the downstream ATM adapter has a receive cell buffers pool 150 (of FIG. 5) divided into a dynamic pool 154 and a static pool 152. The dynamic pool 154 is used when the VC is in the active queue 162 and the static pool 152 is used when the VC is in the stalled queue.

As is discussed with reference to FIG. 4, when the upstream ATM switch 100 sets up a flow-controlled connection (VCI 106, for example) with the downstream adapter 112, the downstream adapter 112 sends an initial credit balance so that the upstream adapter 112 can start sending cells. This credit balance comes from the static pool 152, which must be large enough to cover all of the credit balances for all the potentially simultaneous open connections.

Referring again to FIG. 4, the local memory 116 of the downstream ATM adapter 112 maintains a list of supported VCs in a descriptor entry called VC entry (VCE) 136. The VCE entry 136 contains information about the reassembled packet. The VCE entry 136 also contains two pointers which are used to form a doubly linked list of VCEs (oldest VC first, youngest VC last) and by which either the active queue 162 or the stalled queue (164-0 through 164-7) is constructed.

Figure 7:
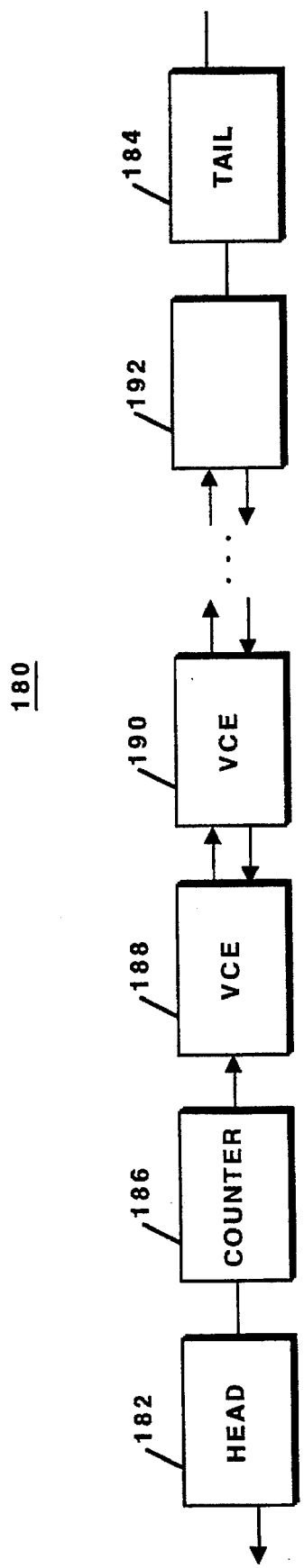

Referring to FIG. 7, an exemplary doubly linked list queue of VCEs 180 is shown to include a head 182, a tail 184, and a counter entry 186. The counter entry 186 is used to indicate how many VCEs are located in the exemplary doubly linked list queue of VCEs 180. In FIG. 7, three VCEs entries are shown labeled as 188, 190, and 192, respectively. After the conditions for the VCE 188 are met (more fully described below), it can be moved to the active queue 162. Only then will the conditions for the next VCE 190 in queue 180 be examined with regard to moving it to the actice queue.

When an ATM cell for a VC is received by a receiver portion 118 of the downstream ATM adapter 112, the VC may be in the stalled queue, 164-0 for example, or not queued at all. If the VC is not queued, it will be queued as the youngest element 192, for example, in either the active queue 162 or the stalled queue 164-0.

If there is more than one queue that has the correct conditions to move an entry into the active queue 162, the stalled queues are selected according to a first in first out (FIFO) arbitration scheme, i.e., the oldest VCE 188 is dequeued from the selected stalled queue and is enqueued as the youngest element in the active queue 162.

Each of the VCEs 186, 188, 190, and 192 contain three indicator variables. A first indicator variable is referred to as a VC_queue variable and may be assigned one of three values. A VC_queue variable with a value of "00" indicates that the VC is not queued at all. A VC_queue variable with a value of "01" indicates that the VC is queued in a stalled queue. A VC_queue variable with a value of "10" indicates that the VC is queued in the active queue. The downstream ATM adapter 112 will only return credits 122 to the upstream ATM switch 100 if the VC is queued to the active queue 162, i.e., that the VC_queue variable has a value of "10".

A second indicator variable is referred to as a VC_credit_count variable. The VC_credit_count variable counts the number of ATM cells which the downstream ATM adapter 112 has received for this VC while it was queued in the stalled queue. The value of the VC_credit_count variable is the number of credits the downstream ATM adapter 112 did not return for that VC. These credits will ultimately be returned when the VC transitions into the active queue.

A third indicator variable is referred to as a VC_count variable. The VC_count variable represents the number of ATM cells received which belong to the same packet, which is currently being assembled.

The three indicator variables, i.e., VC_queue, VC_credit_count, and VC_count, are used in the following manner. For each queue, the downstream ATM adapter 112 counts the exact number of buffers used from both the dynamic pool 154 and the static pool 152. The downstream ATM adapter 112 also keeps a "commitment" counter which counts how many cell buffers the downstream ATM adapter 112 is committed for. Before each packet is enqueued into the active queue 162, the downstream ATM adapter 112 checks if it has enough buffering in its local memory 116 for receiving the maximum packet length possible on that queue. If the downstream ATM adapter 112 has enough buffering in its local memory 116, it "marks" these buffers as committed and treats them as being utilized.

There are three points in time where the downstream ATM adapter 112 might activate a VC. A first point in time is when the packet is moved into the active queue 162. The downstream ATM adapter 112 commits to acomadate for the maximum packet length on this queue.

A second point in time is when the packet reassembly has been completed but not sent out to host memory. The downstream ATM adapter 112 adjusts a committed buffers counter so that it reflects the actual packet size if the received packet size is less than the maximum packet size possible on this VC. Thus, the committed buffers counter is adjusted by substracting the value [(Max_pkt_size)–(the_size_of_the_received_pkt)].

A third point in time when the downstream ATM adapter 112 activate the next VC (VC 188 in FIG. 7) is when the packet has completed reassembly and is stored to host memory. The downstream ATM adapter 112 frees up the cell buffers in its local memory 116 for that packet. Thus, the free buffers counter is adjusted, i.e., incremented, with the_size_of_the_received_pkt.

The downstream ATM adapter 112 will decide to activate a VC according to the difference between the free buffers counter, and the committed, the static and the max_pkt_size buffers. Activating a VC refers to the process of enqueuing a VC to the active queue 162. A VC may be activated after it is dequeued from the stalled queue, or if the first ATM cell of the packet is received and the VC is idle, and there is enough buffers in the free dynamic memory pool to accomadate a maximum size packet from that VC.

For each queue the downstream ATM adapter 112 maintains four variables stored in its local memory 116. A first variable is referred to as a free_buffers variable. The free_buffers variable contains a value which represents the sum of the dynamic pool 154 buffers and the static pool 152 buffers for all VCs destined to this queue.

A second variable is referred to as a static_buffers variable. The static_buffers variable contains a value which represents the number of static buffers pool 152 across all VCs destined to this queue.

A third variable is referred to as a committed_buffers variable. The committed_buffers variable contains a value which represents the number of ATM cell buffers the downstream ATM adapter has committed to. This value is initialized to zero and for each packet moved into the active queue 162, the committed_buffers variable is incremented to accomadate for the maximum packet length possible on this VC, i.e., max_pkt_len.

A fourth variable is referred to as a max_pkt_len variable. The max_pkt_len variable contains a value which represents the maximum packet length on a group of VCs destined to this queue.

Buffer and credit management in the downstream ATM adapter 112 operates according to the following rules:

---
Rule 1 (first ATM cell)
---

For a first ATM cell received do:
  If VC_queue = 0 then:
    If (free_buffers - committed_buffers - max_pkt_len) >
    static buffers do:
      enqueue the VC to active queue
      committed_buffers committed_buffers + max_pkt_len
    else do:
      enqueue the VC to the stalled queue ---
Rule 2 (Every ATM cell)
---

For every ATM cell do:
  free_buffers = free_buffers − 1
  VC_count = VC_count + 1
  If the VC is in the active queue do:
    committed buffers = committed_buffers − 1
  If the VC is in the stalled queue do:
    static_buffers = static buffers − 1
    VC_credit_count = VC_credit_count + 1

---
Rule 3 (Last ATM Cell)
---

After the downstream ATM adapter 112 receives the last
ATM cell do:
  if the VC is in the active queue 162, do:
    committed_buffers = committed_buffers − max_pkt_len
    + VC_count
    VC_count = 0
  Dequeue the VC from the active queue
  VC_Count = 0

---
Rule 4 (when storing a packet in host memory)
---

After the downstream ATM adapter 112 stores a packet in
host memory, the number of cell buffers freed, i.e., the
actual packet length, are added to free_buffers.

---
Rule 5 (When to activate a stalled queue)
---

If the packet has completed reassembly the downstream ATM
adapter can activate a stalled VC if:
  free_buffers − committed_buffers − (maximum value of
  VC_Credit _count) > static_buffers
If the packet has not completed reassembly, the
downstream ATM adapter can activate a VC if:
  free_buffers − committed_buffers − (maximum value of
  VC_credit_count) − (max_pkt_len − VC_count))>
  static_buffers ---
Rule 6 (When activating a stalled queue)
---

To activate a VC, do:
  static_buffers = static_buffers + VC_credit_count
  Dequeue the VC from stalled queue
  If the packet has not completed reassembly do:
    committed_buffers = committed_buffers + max_pkt_len
    − VC_count

---

Figure 8:
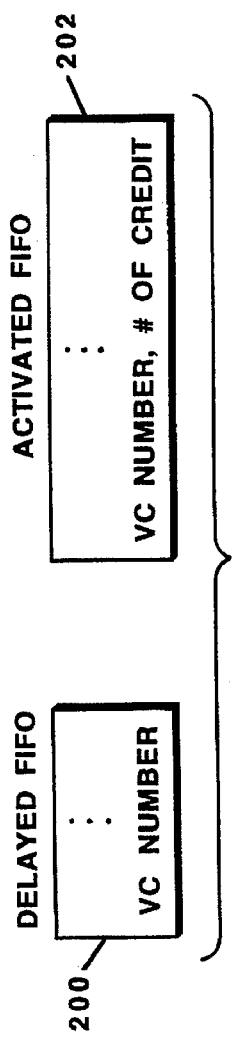

Referring to FIG. 8, the credit return mechanism 122 (of FIG. 4) of the downstream ATM adapter 112 utilizes two first-in-first-out (FIFO) queues. A first FIFO is referred to as a credit delayed FIFO 200. The credit delayed FIFO 200 is used to store credits that are delayed. Only one credit may be returned in one ATM cell. Whenever the downstream ATM adapter 112 returns credits from an activate FIFO 202 (discussed below), the flow of returning credits for VCs in the active queue 162 are temporarily put in the credit delayed FIFO 200. The credit delayed FIFO 200 holds the VC number as the credit.

The activate FIFO 202 is used to store credits that are scheduled to be returned when the VC was moved from the stalled queue 164 to the active queue 162. All the credits that were placed in the stalled queue 164 are put into one entry in the activate FIFO 202. An entry of the activate FIFO 202 holds the VC number and VC_credit_count values.

In operation, the downstream ATM adapter 112 will use an arbiter to determine from which FIFO to return credits. The arbiter uses a dynamic 1-of-N arbitration (1 from activate FIFO 202, N from delayed FIFO 200), where N is increasing as the number of entries in the delayed FIFO 200 is increasing. This gives to the delayed FIFO 200 a fair share of the returned credit bandwidth.

The dynamic 1-of-N arbitration works as follows. As long as the delayed FIFO 200 has less than or equal to 56 credits stored, for every credit returned from the activate FIFO 202, 32 credits will be returned from the delayed FIFO 200. As long as the delayed FIFO 200 has more than 56 and less than or equal to 4K credits stored, for every credit will be returned from the activate FIFO 202, 64 credits will be returned from the delayed FIFO 200. As long as the delayed FIFO 200 has more than 4K and less than or equal to 8K credits stored, for every credit returned from the activate FIFO 202, 128 credits will be returned from the delayed FIFO 200. As long as the delayed FIFO 200 has more than 8K and less than or equal to 16K credits, for every credit returned from the activate FIFO 202, 256 credits will be returned from the delayed FIFO 200. If there are more than 16K credits in the delayed FIFO 200, credits will return only from the delayed FIFO 200.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. An asynchronous transfer mode (ATM) network device comprising:

a receiver portion, said receiver portion capable of receiving a plurality of ATM cells on one of a plurality of virtual circuits (VCs) from an upstream ATM switch;

a local memory, said local memory used to store the plurality of ATM cells;

means for managing said local memory using a plurality of queues;

means for assembling ATM cells into a plurality of packets;

means for transmitting said plurality of packets to a host memory; and a transmitter portion, said transmitter portion having a means for indicating said transmitting of said packets from said local memory to said host memory to said upstream ATM switch.

2. The ATM network device according to claim 1 wherein said local memory further comprises:

a dynamic pool of memory in said local memory, said dynamic pool used to reassemble said plurality of ATM cells into a plurality of packets; and a static pool of memory in said local memory, said static pool used to store said plurality of ATM cells arriving from said upstream ATM switch.

3. The ATM network device according to claim 2 wherein the static pool of memory is sized as a minimum memory size said ATM network device requires to have as buffering in said local memory.

4. The ATM network device according to claim 2 wherein the static pool of memory is sized by taking a product of the number of VC and a number of initial credits per VC.

5. The ATM network device according to claim 2 wherein said local memory further comprises a plurality of queues for packet reassembly.

6. The ATM network device according to claim 5 wherein said plurality of queues comprise:

an active queue;

a plurality of stalled queues; and means for controlling an interaction between said active queue and said plurality of stalled queues.

7. The ATM network device according to claim 6 wherein said plurality of stalled queues comprise eight stalled queues.

8. The ATM network device according to claim 6 wherein said means for controlling said interaction between said active queue and said plurality of stalled queues comprises:

means for receiving said plurality of ATM cells of a first virtual circuit (VC);

means for determining where to place said plurality of ATM cells of said first VC in said plurality of queues; and means for returning an ATM credit to said upstream ATM switch.

9. The ATM network device according to claim 8 wherein one of said plurality of ATM credits is returned to said upstream ATM switch when said VC is placed in said active queue.

10. The ATM network device according to claim 8 wherein one of said plurality of ATM credits is stored in said local memory while said VC is stored in one of said stalled queues.

11. The ATM network device according to claim 10 wherein said ATM credit is returned to said upstream ATM switch when said VC is dequeued from said of said stalled queues and enqueued to said active queue.

12. The ATM network device according to claim 8 wherein said means for determining comprises:

means for storing in said local memory a list of supported VCs in a descriptor entry, said descriptor entry containing two pointers, said pointers used to form a doubly-linked list by which said active queue and said plurality of stalled queues are constructed, said descriptor entry having a counter entry, said counter entry used to indicate the number of VC in said doubly-linked list, said descriptor entry having a plurality of indicator variables;

means for receiving a first VC;

means for placing said first VC in said active queue;

means for placing said first VC in one of said plurality of stalled queues; and means for moving said first VC in one of said plurality of stalled queues to said active queue.

13. The ATM network device according to claim 12 wherein said plurality of indicator variables comprise:

a VC queue variable, a value of said VC queue variable indicating whether said first VC is not queued at all, whether said first VC is queued in said active queue, and whether said first VC is queued in one of said plurality of said stalled queues;

a VC credit count variable, said VC credit count variable indicating the number of ATM cells which said ATM device has received on said VC while queued in one of said plurality of said stalled queues;

a VC count variable, said VC count variable indicating the number of ATM cells received by said ATM network device which belong to said VC; and a commitment counter, said commitment counter indicating the number of memory buffers the ATM network device is committed for.

14. The ATM network device according to claim 13 wherein said means for controlling said interaction between said active queue and one of said plurality of stalled queues further comprises:

means for checking an initial available buffer size of said local memory;

means for marking said initial available buffer size as committed; and means for changing said initial available buffer size, said means comprising the steps of:

committing a maximum packet on said VC when said packet is moved from one of said stalled queues to said active queue;

adjusting said size by said size of said received packet if said packet has not been sent to said host memory to the difference between said maximum packet size and said size of said received packet size; and adjusting said size by said size of said received packet if said packet is ready to be sent to said host memory and has not been sent to said host memory by said size of said received packet.

15. The ATM network device according to claim 14 wherein said plurality of indicator variables further comprise:

a free buffers variable, said free buffers variable containing a value which represents the sum of the dynamic pool buffers and the static pool buffer for all VCs destined to said queue;

a static buffers variable, said static buffers variable containing a value which represents a number of static pool buffers across all of said VCs destined to said queue;

a committed buffers variable, said committed buffers variable containing a value which represents a number of ATM cell buffers said ATM network device has committed to; and a maximum packet length variable, said maximum packet length variable containing a value which represents a maximum packet length on a plurality of VCs destined to said queue.

16. The ATM network device according to claim 13 further comprising:

means for managing said plurality of buffers; and means for managing a return of credits from said transmitter portion to said upstream ATM switch.

17. The ATM network device according to claim 16 wherein said means for managing said plurality of buffers comprises means for responding to the movement of one of said plurality of ATM cells, said means for responding operating according to a plurality of rules.

18. The ATM network device according to claim 17 wherein said plurality of rules comprise:

a first rule, said first rule applied if said received ATM cell is a first ATM cell;

a second rule, said second rule applied for every received ATM cell;

a third rule, said third rule applied if said received ATM cell is said last ATM cell received;

a fourth rule, said fourth rule applied when storing one of said plurality of packets in said host memory;

a fifth rule, said fifth rule applied when determining when to activate said stalled queue; and a sixth rule, said sixth rule applied when activating said stalled queue.

19. The ATM network device according to claim 18 wherein said first rule comprises the steps of:

determining whether a value of said free buffers variable minus said committed buffers variable minus said maximum packet length variable is greater than said value of said static buffers variable;

enqueuing said first ATM cell to said stalled queue if said value is not greater than said value of said static buffers variable; and enqueuing said VC to said active queue if said value is greater than said value of said static buffers variable.

20. The ATM network device according to claim 18 wherein said second rule comprises the steps of:

decrementing said free buffers variable by one;

incrementing said VC count variable by one;

decrementing said committed buffers variable by one if said VC is in said active queue;

decrementing said static buffers by one if said VC is in said stalled queue; and incrementing said VC credit count variable by one if said VC is in said stalled queue.

21. The ATM network device according to claim 18 wherein said third rule comprises the steps of:

assigning said committed buffers variable the value of the committed buffers variable minus said maximum packet length variable plus said VC count variable if said VC is in said active queue; and setting the VC count variable equal to zero if said VC is in said active queue.

22. The ATM network device according to claim 18 wherein said fourth rule comprises the step of adding the number of cell buffers freed to said free buffers variable.

23. The ATM network device according to claim 18 wherein said fifth rule comprises the steps of:

activating a VC if the value of free buffers minus committed buffers minus said maximum value of said VC credit count variable is greater than the value of said static buffers variable; and activating a VC if the value of free buffers minus committed buffers minus said maximum value of said VC credit count variable minus said maximum packet length minus said VC Count variable is greater than the value of said static buffers variable.

24. The ATM network device according to claim 18 wherein said sixth rule comprises the steps of:

setting the value of said static buffers variable to said static buffers variable plus said VC credit count;

dequeuing said VC from stalled queue; and setting the value of said committed buffers variable to committed buffers variable plus said maximum packet length variable minus aid VC count variable if aid packet has not completed reassembly.

25. The ATM network device according to claim 16 wherein said means for managing a return of credits from said transmitter portion to said upstream ATM switch comprises:

a plurality of first-in-first out (FIFO) queues, a first FIFO queue used to store a plurality of credits scheduled to be returned, a second FIFO queue used to store aid VC number as a credit; and arbitration means to determine from which of said FIFOs to return credits.

26. The ATM network device according to claim 25 wherein said arbitration means comprises a 1-of-N arbitration method.

* * * * *

UNITED STATES PATENT AND TRADEMARK OFFICE
CERTIFICATE OF CORRECTION

PATENT NO.   : 5,633,867
DATED        : May 27, 1997
INVENTOR     : Ben-Num et al.

It is certified that error appears in the above-identified patent and that said Letters Patent is hereby corrected as shown below:

On the title page, item [*] should read:

[*] Notice:   The term of this patent shall not extend beyond the expiration date of Pat. No. 5,483,526.

Signed and Sealed this

Twelfth Day of September, 2000

Attest:

Q. TODD DICKINSON

*Attesting Officer*              *Director of Patents and Trademarks*